United States Patent [19]

Ramsay

[11] Patent Number: 5,604,859
[45] Date of Patent: Feb. 18, 1997

[54] DISPLAY OF PARTIAL PERIODIC TABLE ARRAYS

[76] Inventor: O. Bertrand Ramsay, 1203 Sherman, Ypsilanti, Mich. 48197

[21] Appl. No.: 220,104

[22] Filed: Mar. 30, 1994

[51] Int. Cl.⁶ .................................................. G06F 19/00
[52] U.S. Cl. .......................... 395/161; 364/496; 434/282
[58] Field of Search .................................. 364/496, 706, 364/709.02, 709.11, 709.12, 709.13, 709.14, 709.15, 715.01; 395/100, 155, 159, 161, 156, 160; 434/281, 282, 298

[56] References Cited

U.S. PATENT DOCUMENTS

| | | | |
|---|---|---|---|
| 4,473,890 | 9/1984 | Araki | 364/496 |
| 4,689,753 | 8/1987 | Cameron | 364/496 |
| 5,265,029 | 11/1993 | Ramsay | 364/496 |
| 5,379,234 | 1/1995 | Wilson et al. | 364/496 |
| 5,386,507 | 1/1995 | Teig et al. | 395/159 |

OTHER PUBLICATIONS

HP Solve Equation Library Application Card Manual, Edition 1, FEB 1990, pp. 129–146.
Test and Measurement Catalog, Hewlett Packard, 1991, p. 674.
CAChe WorkSystem, CAChe Reference v. 3.0, 1992, pp. 1–53.

*Primary Examiner*—Ellis B. Ramirez
*Assistant Examiner*—Kyle J. Choi
*Attorney, Agent, or Firm*—Joseph C. MacKenzie

[57] ABSTRACT

Displaying a partial array of the periodic table of elements, elements, and an icon representative of the whole table at the same time. The part of the icon corresponding to the partial array is visually distinguishable from the rest of the icon.

14 Claims, 11 Drawing Sheets

| PERCENT COMPOSITION | | | |
|---|---|---|---|
| 3 K | = | 117.29 amu | 35.63 % POTASSIUM |
| 1 Fe | = | 55.85 amu | 16.96 % IRON |
| 0 C | = | 72.07 amu | 21.00 % CARBON |
| 6 N | = | 84.04 amu | 75.52 % NITROGEN |
| | | 329.25 fmu | 100.00 % $K_3FeC_6N_6$ |

FORMULA: $K_3FeC_6N_6$ — C
$K_3Fe(CN)_6$

| F1 help | F2 elem | F3 pair | F4 form | F5 calc | F6 rxn | F7 empf | F8 salt | F9 A-B | F10 exit |

DISPLAY OF PARTIAL PERIODIC TABLE ARRAYS

My U.S. Pat. No. 5,265,029 relates to displaying a periodic table array on a computer or calculator, and allowing a user to have access both visually and manually to the array, for the display of element symbols, parameters associated with such elements, etc., as well as providing the user with the means for performance of functions such as making chemical calculations, writing chemical formulae, etc., and also for displaying element symbols, element parameters and/or results of performing said functions.

One form of the invention of my patent has a keyboard having keys upon which the element symbols are placed, and which are arranged in the form of the periodic table of elements. In addition, the keyboard has additional keys which, among other things, are used in carrying out the aforesaid functions. In a variation of this scheme, the keyboard hardware is replaced by its "touch" equivalent on the screen of the monitor, or other display device for presenting the results of using the keyboard.

BRIEF DESCRIPTION OF THE INVENTION

The full periodic table takes up considerable space on the keyboard or screen, so one object of the present invention is to provide the user with the benefits of being able to view and use the periodic table, but in less space, enough less, in fact, to accommodate the full table in a small calculator, say of the size, and in many ways, like the HP48SX, which is referred to in my above-identified patent.

My present invention can be practiced using a keyboard having too few keys to deal with the whole periodic table at once, whether they are in the form of an array of hardware, or of pixels on a screen.

As it happens, for all practical purposes, the full periodic table array can be broken down into partial arrays which, in appearance, show to one of ordinary chemical skills that they are part of the full periodic table array. That is, the elements in a given partial array are positioned with respect to one another just as in the full array, and the said given partial has the same outline as in the full array of all the elements.

In my invention, further, any style of keyboard will do, if it has enough keys to accommodate the partial arrays, and also has a display of appropriate size. In one case, "appropriate capacity" is such as to accommodate any one of the partial arrays, and, as well, a chemical formula display, and an icon in the form of the whole periodic table array. The icon will be too small for element symbols to be readably displayed thereon, yet large enough both to depict the shape of the full array, i.e., the whole periodic table, and to allow the latter's rows and columns to be displayed with adequate visibility. Also, the icon will have sufficient dimension that any portion thereof corresponding to a partial array can be highlighted, or made otherwise visually distinguishable from the remainder of the icon.

A unique advantage of such an arrangement is that it can be practiced with the "QWERTY" keyboard, almost universally provided with computers. Dworak keyboards would work, too, as would calculator keyboards such as that of the aforementioned HP48SX. It is evident that a "QWERTY" arrangement is not crucial to the broad concept of my invention, although I consider it sufficiently unique and useful to think that it is patentable in its own right.

BRIEF DESCRIPTION OF THE DRAWING

FIG. 4 is like FIG. 3 except that the partial array contains a different set of representative elements;

N. B. While displays, such as icon I, are shown as having various shadings which set off the squares from one another, in this case, it is to be considered that solid black shows any particular set of squares which are to be distinguished as a whole from the remainder of the periodic table outline which the icon I portrays.

DETAILED DESCRIPTION OF THE INVENTION

Figure 1:
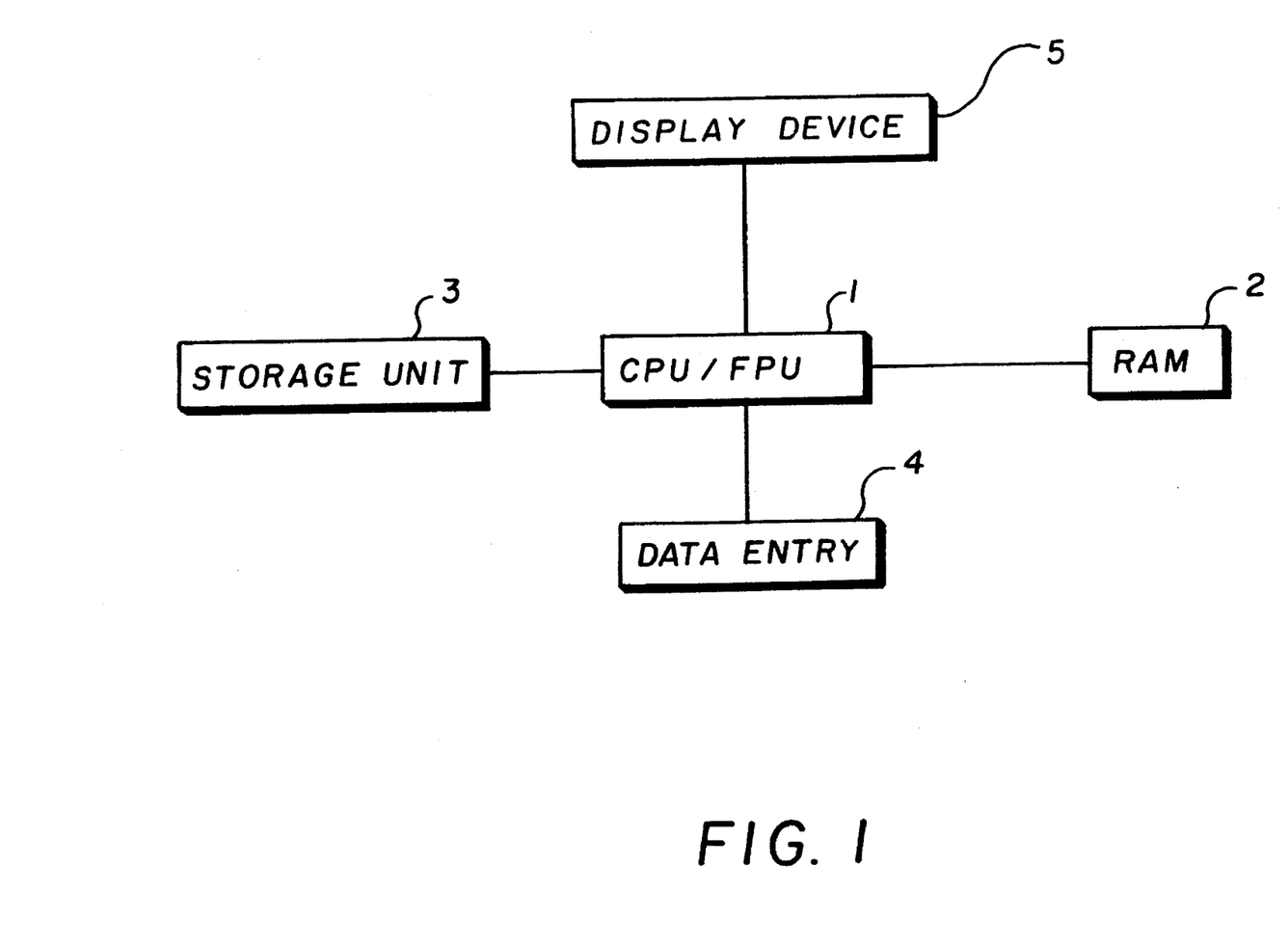
FIG. 1 is a box diagram of a chemical calculator in accordance with my invention.
Figure 2:
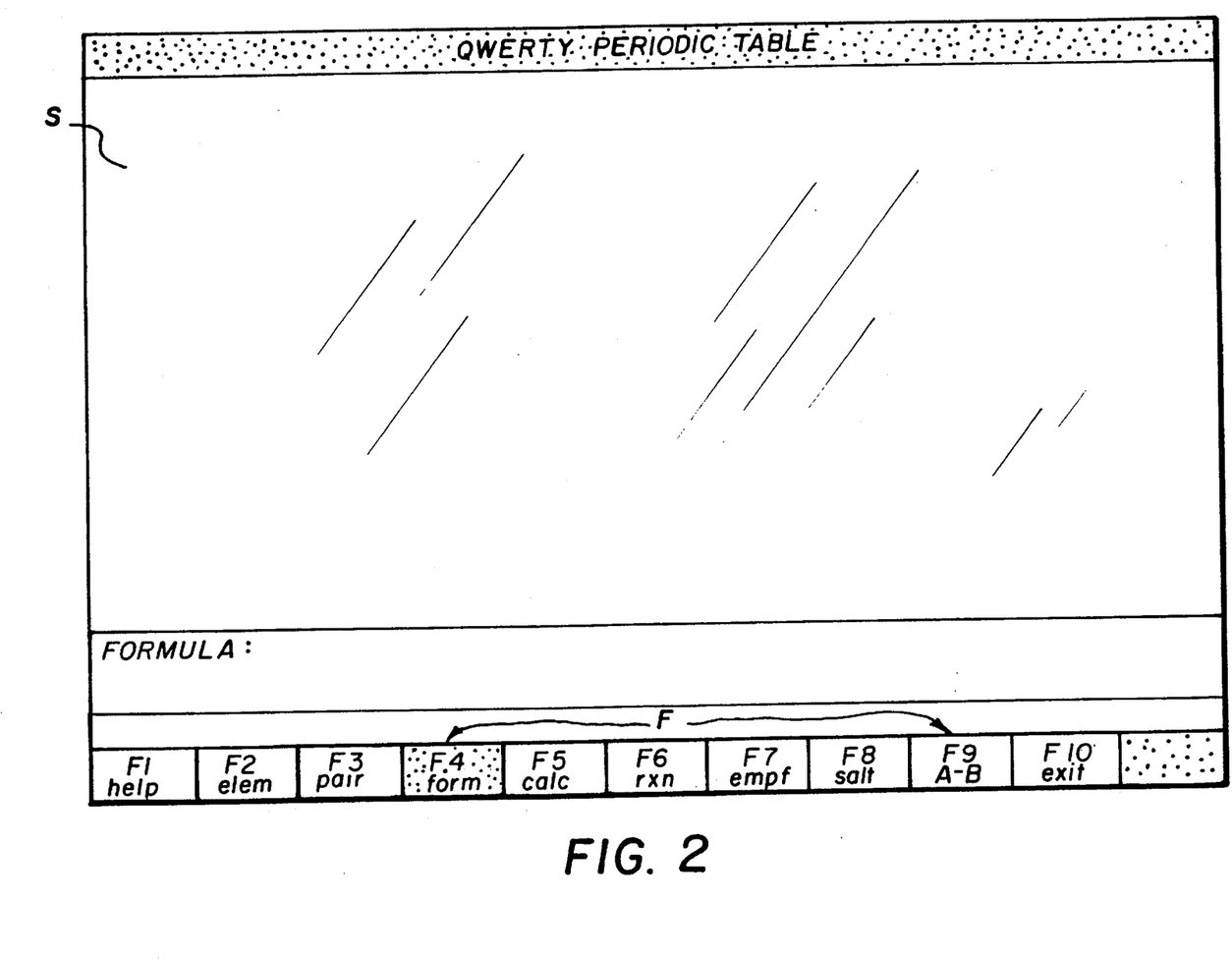
FIG. 2 is a plan view of a CRT screen on which there is displayed one stage of operation of my invention when it is in formula weight and percentage composition calculating mode.

FIG. 1 is a diagram showing a combination of elements such as would be used for chemical calculation and data display in my invention, and FIG. 2 represents the display screen of, for example, a conventional monitor, and omits all detail of the housing, etc., thereof.

It is to be supposed that connected to the monitor is a calculator like that disclosed in my above-identified U.S. patent. However, unlike that calculator it has no data entry device in the form of a keyboard wherein the keys thereof are coded with the appropriate chemical symbols, which are caused to be displayed on the screen when the keys are depressed. Instead, such entry will be made by means of a conventional "QWERTY" keyboard, such as that used by practically all personal computers, such as those made by Apple, IBM, Franklin, and numerous other makers of "PC"s. Likewise, a PC of that sort will be programmed in accordance with the principles set forth in my patent.

For brevity's sake, FIG. 1 is not shown here in any detail. Its schematic showing here, because it is identical to FIG. 1 of my patent, will be adequate.

Thus, any personal computer will have a CPU/FPU 1, RAM 2,

STORAGE UNIT 3, DATA ENTRY 4, and DISPLAY DEVICE 5.

Figure 3:
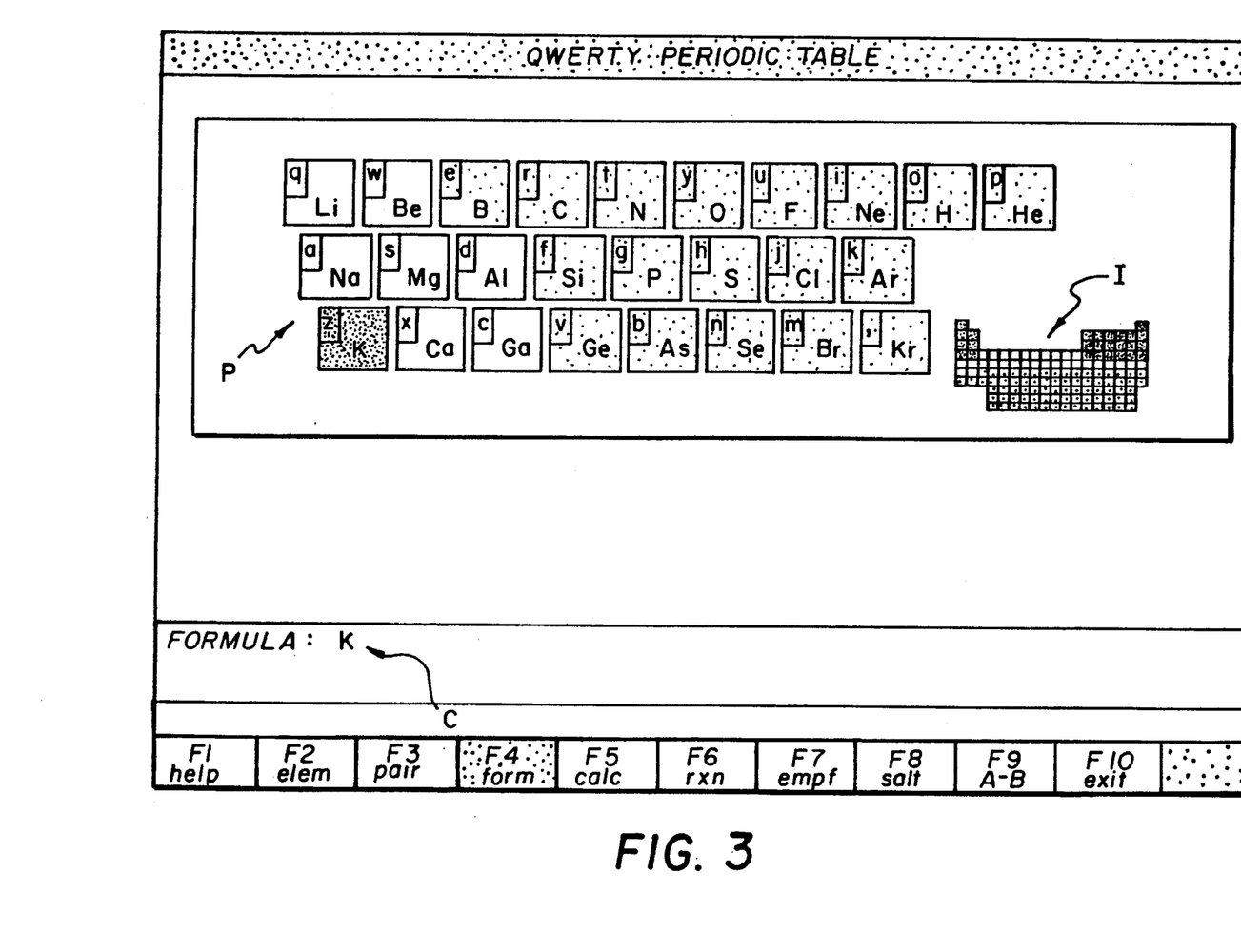
FIG. 3 is like FIG. 2 except that it displays a second stage in the FIG. 2 mode, wherein a partial array which contains representative elements is shown on the CRT screen.

FIG. 3 shows the monitor screen as it appears in the first stage of operation of my invention: a generally blank screen 6 displaying thereon the legend FORMULA:. Along the bottom of the screen are displayed the designations F1 through F10. If the typical QWERTY keyboard is that of a PC, these F's are used to identify the functions of the keyboard's F keys. For example, F4 means "formula mode". In the present example, F4, when pressed, permits the user to write a chemical formula for calculation of formula weight and percent composition.

In FIG. 3, pressing the QWERTY keyboard's space bar has caused a partial array of elements from the periodic table to be displayed on the screen. The partial array consists of "representative elements" from rows 2, 3 and 4, and columns (that is, families) 1A through 8A of the periodic table. It is convenient to include hydrogen and helium under 9A and 10A. It is to be noted that users of my invention will have some skill in the chemical arts and so will not be misled by eliminating hydrogen and helium from columns 1A and 8A. In addition, spacing is not needed for chemical calculation in this application, so the space bar can be used for other purposes.

The partial array contains 24 elements, whose symbols are positioned, with respect to one another, just as in the periodic table, except that it is expedient to stagger the rows to reflect the arrangement of the corresponding keys of the QWERTY keyboard. Further, each element symbol has the corresponding QWERTY key symbol appearing next to it. Thus, the chemical element symbol K appears on the z key of the QWERTY keyboard, meaning that to display K (for potassium, of course), one presses the z key, whereupon a "K" appears on the screen to the right of "Formula", and the square which contains K and z gets highlighted.

It is also expedient to compact parts of the table in the partial arrays. Thus, the partial array P in FIG. 3 corresponds to a portion of the periodic table which also contains B-families of elements, but does not have these. In the partial array, the solid black parts of the icon have been run together. In general, the solid black portions of the icon identify the periodic table regions thereof which go into the corresponding partial arrays.

While one may have recourse to a sort of picture book showing the periodic table, and also having a number of illustrations of the table which depict the boundaries of those partial arrays which may come up on the screen, according to the invention I provide the icon I, which is large enough to show the squares in which the key and element indicia appear, but too small too accommodate the indicia, and highlight it such as to show the outline of the partial array by means of the contrast between the highlighted portion and the rest of the icon. Thus, as shown in FIG. 3, the partial array to the left of the icon is contrasted to the lighter squares above it.

Preferably, the "K" is evoked on the screen by pressing the z key, and then the space bar. N. B., since the usual terminal keyboard will have a variety of keys-in addition to the usual QWERTY complement, the cursor C, at the lower left of the displayed "K", can be moved by arrow keys to the K/z square on the display, after which the space bar can be pressed (or indeed, a mouse could do the moving, and be clicked) to call up the "K".

The indicia 1A through 8A, which are the element family numbers, preferably appear just under indicia 1 through 8. Said indicia, in turn, are the periodic table's column numbers, and appear along the upper border of the partial array.

From the foregoing description, it will be evident that my invention can be utilized to diminish the amount of display area needed for working with the periodic table, without sacrificing the effect of having the whole periodic table under one's eyes. With the ikon I and the partial array, as depicted in FIG. 3, one skilled in the art will always have the feeling of dealing with the periodic table, despite the fact that the whole array of all the elements is not visible as such on the screen S at any time.

Furthermore, note that the 26 alphabet keys, or even the entire key array of the QWERTY keyboard, plus the additional keys provided on terminal versions of the QWERTY keyboard, cannot adequately represent the more than 100 elements of the periodic tables, as well as function keys, and the like.

FIG. 4 represents the same stage as FIG. 3. However, the arrow keys have been used to to change the partial array display to one of a different set of representative elements, namely those of rows 4, 5, and 6 of the periodic table.

Figure 5:
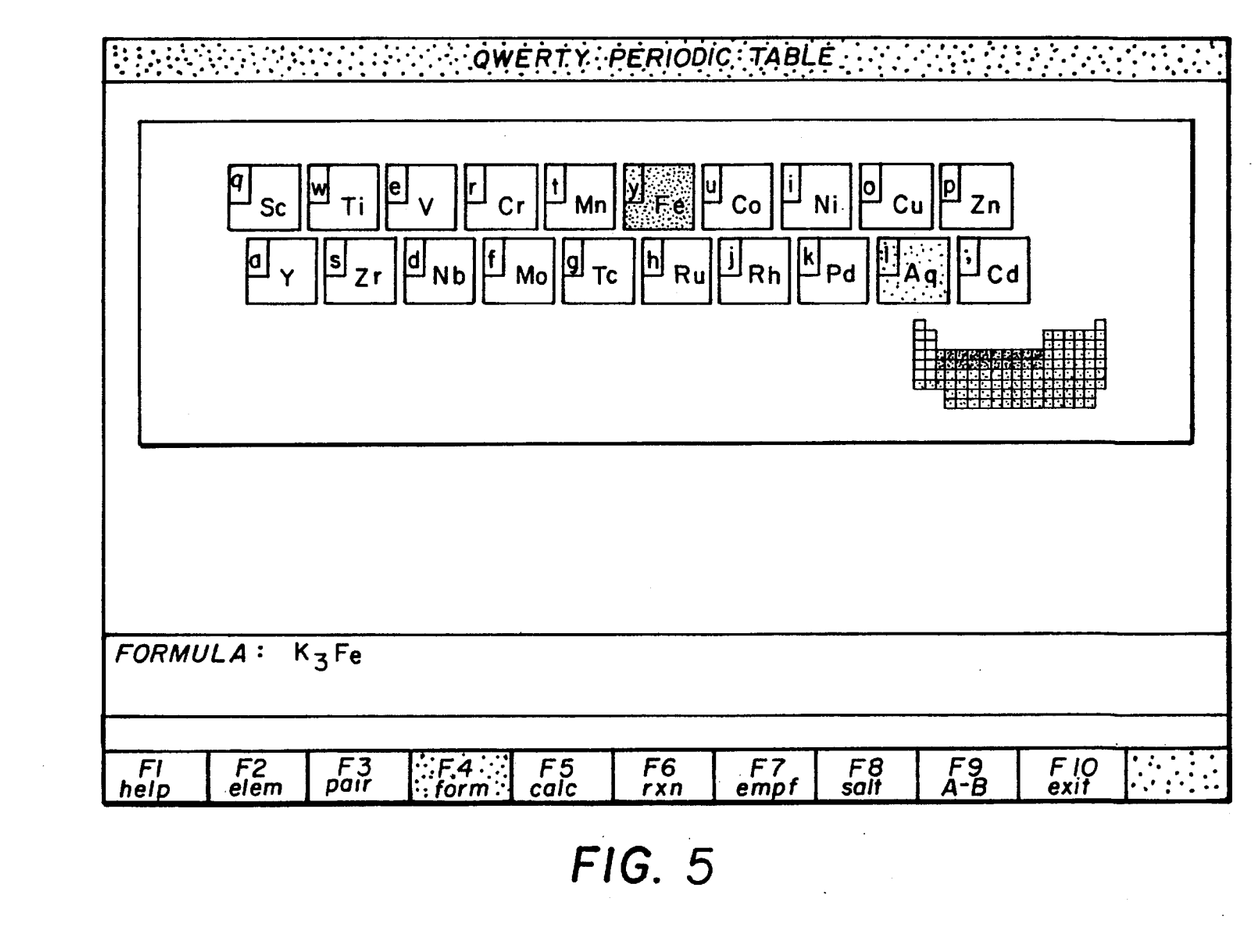
FIG. 5 is like FIGS. 3 and 4, except that the screen displays a partial array containing transition elements, instead of representative elements.
Figure 10:
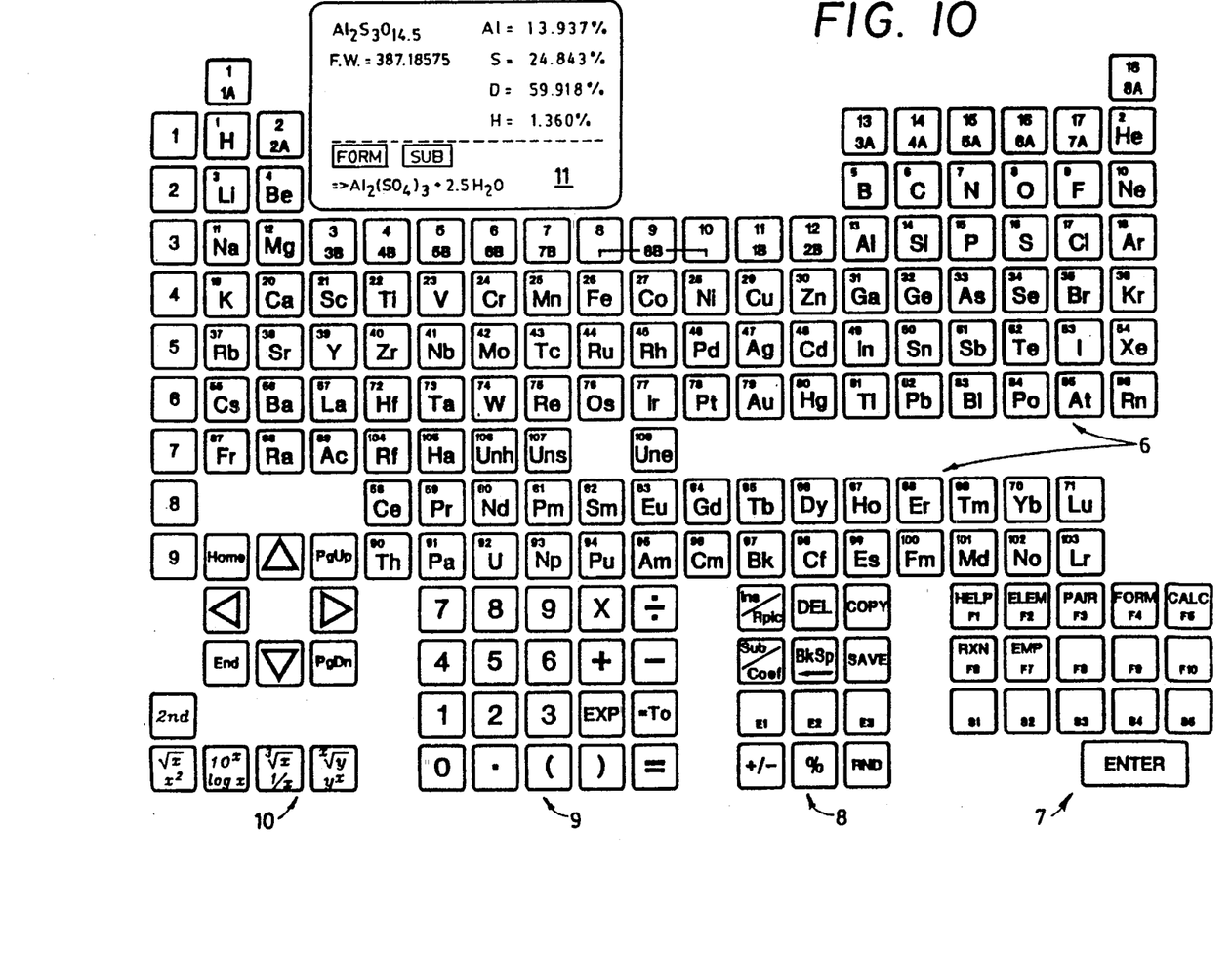
FIG. 10, among other things, shows a periodic table of the kind used for deriving the partial arrays of the present invention.
Figure 11:
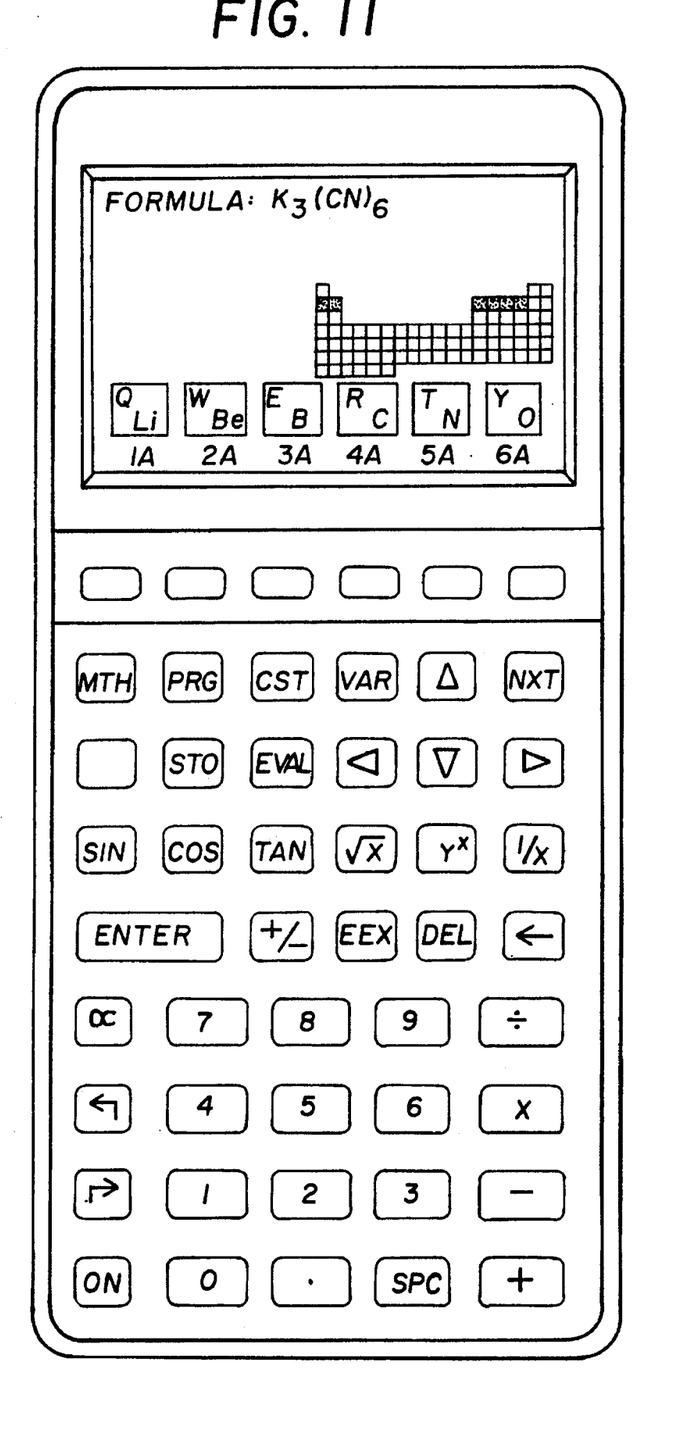
FIG. 11 shows my invention applied to a prior art chemical calculator.

FIG. 5 represents evoking an array of transition elements, whose families 1B through 8B are shown as distributed among columns 3 through 12 of the table shown in FIG. 10. The partial array of transition elements is accessed by the page down key.

In this case, the reason for evoking the FIG. 5 transition element array is to allow writing a formula with Fe. This partial array is gotten by pressing the page down key. The K selected earlier remains on screen, the QWERTY 3 key is pressed to get 3 on scene. Next the y key is pressed, which puts Fe on screen. The result on screen is "K3Fe". It may be noted that selection on screen could be made using the arrow arrow keys, in which case the space bar would be pressed to get the selections on screen.

Figure 6:
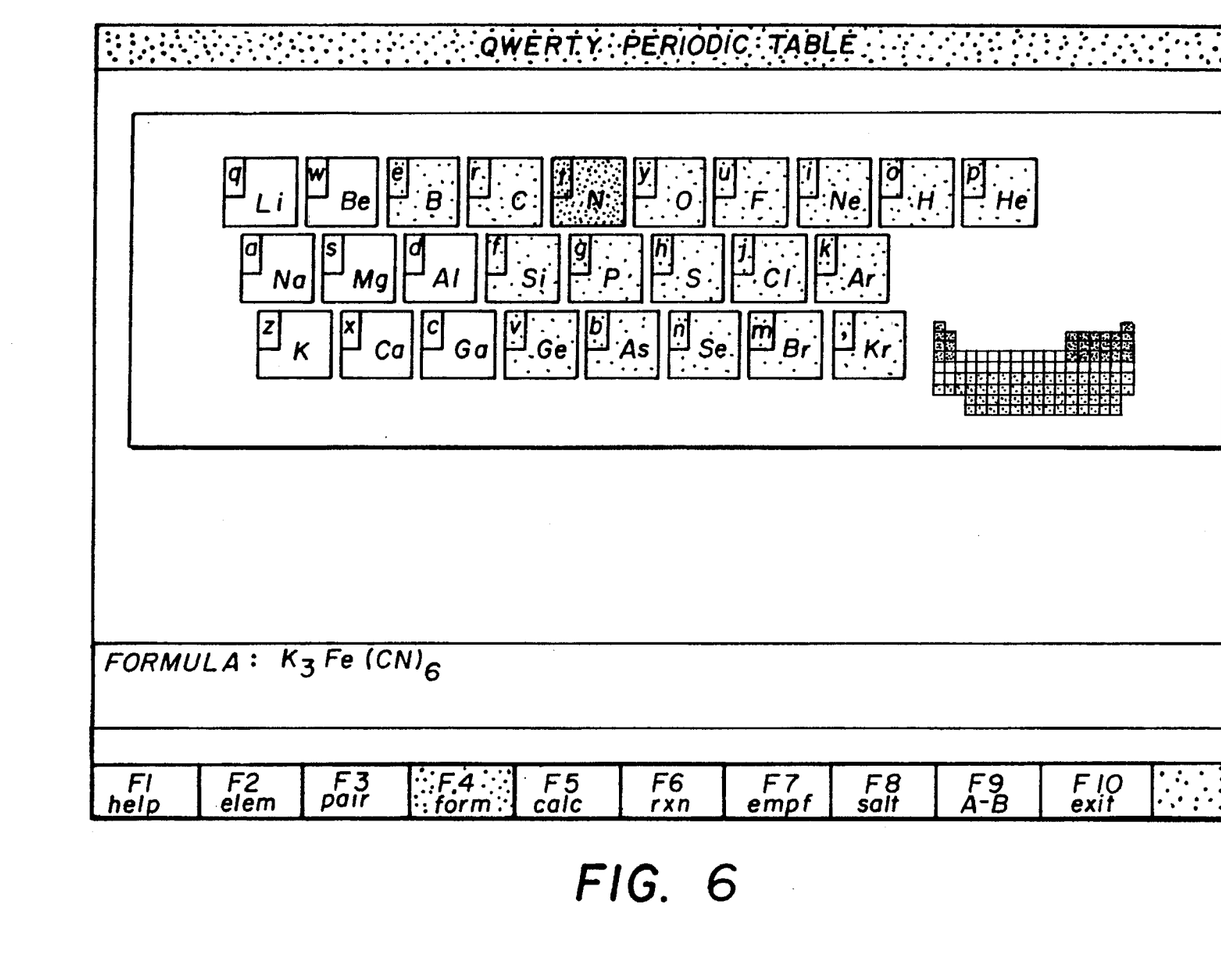
FIG. 6 is like FIG. 3 except that it displays a formula not appearing on the screen in FIG. 3.

In FIG. 6, the formula has been continued by returning to the original partial array, as shown in FIG. 3, and typing the QWERTY symbols: parenthesis, C, N, parenthesis, and 6, in that order. Note that "N" is highlighted. This is because the last character put on screen is the one highlighted.

Figure 7:
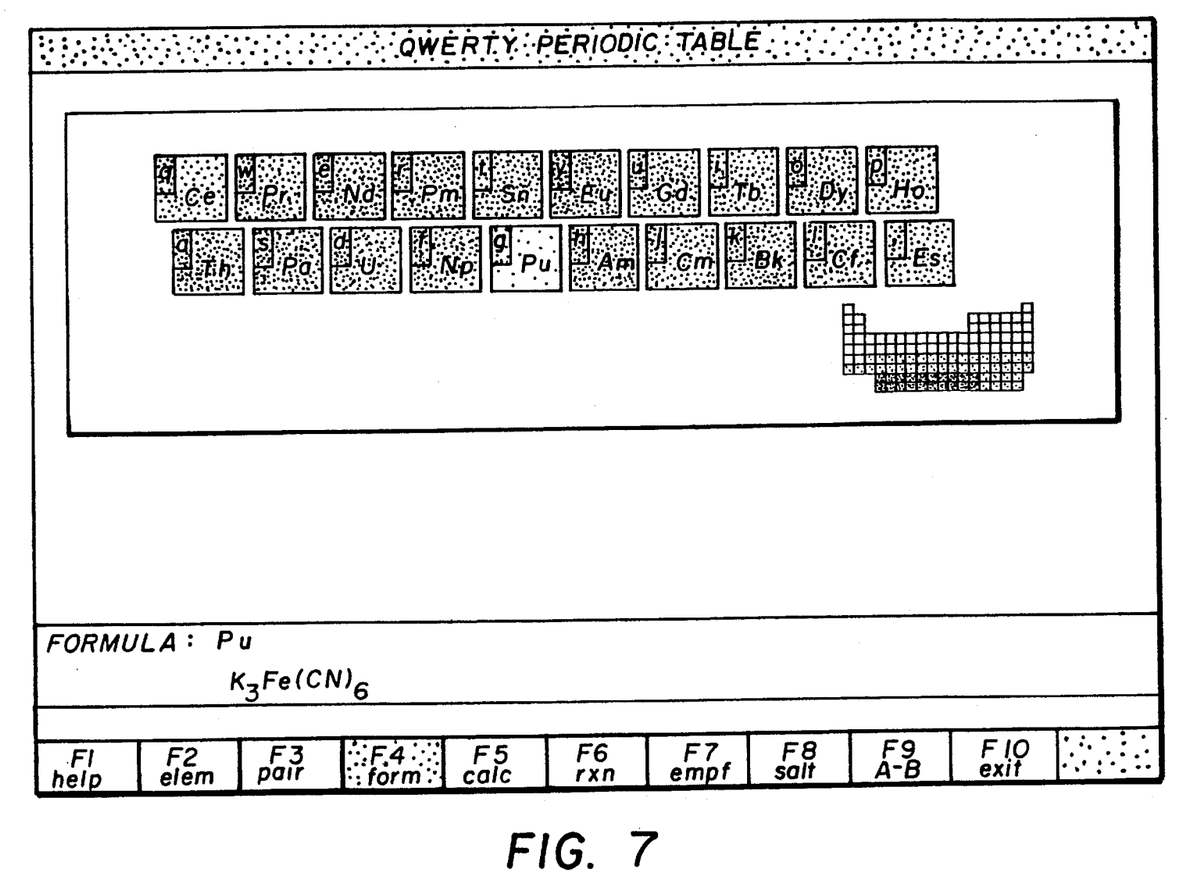
FIG. 7 is like FIGS. 3, 4 and 5 except that the partial array is composed of rare earth elements.

FIG. 7 shows a partial array for the rare earth part of the periodic table. This array is caused to be displayed by pressing the page down twice in succession. Here an element has been selected, namely, plutonium, which was evoked by pressing the y key.

Figure 8:
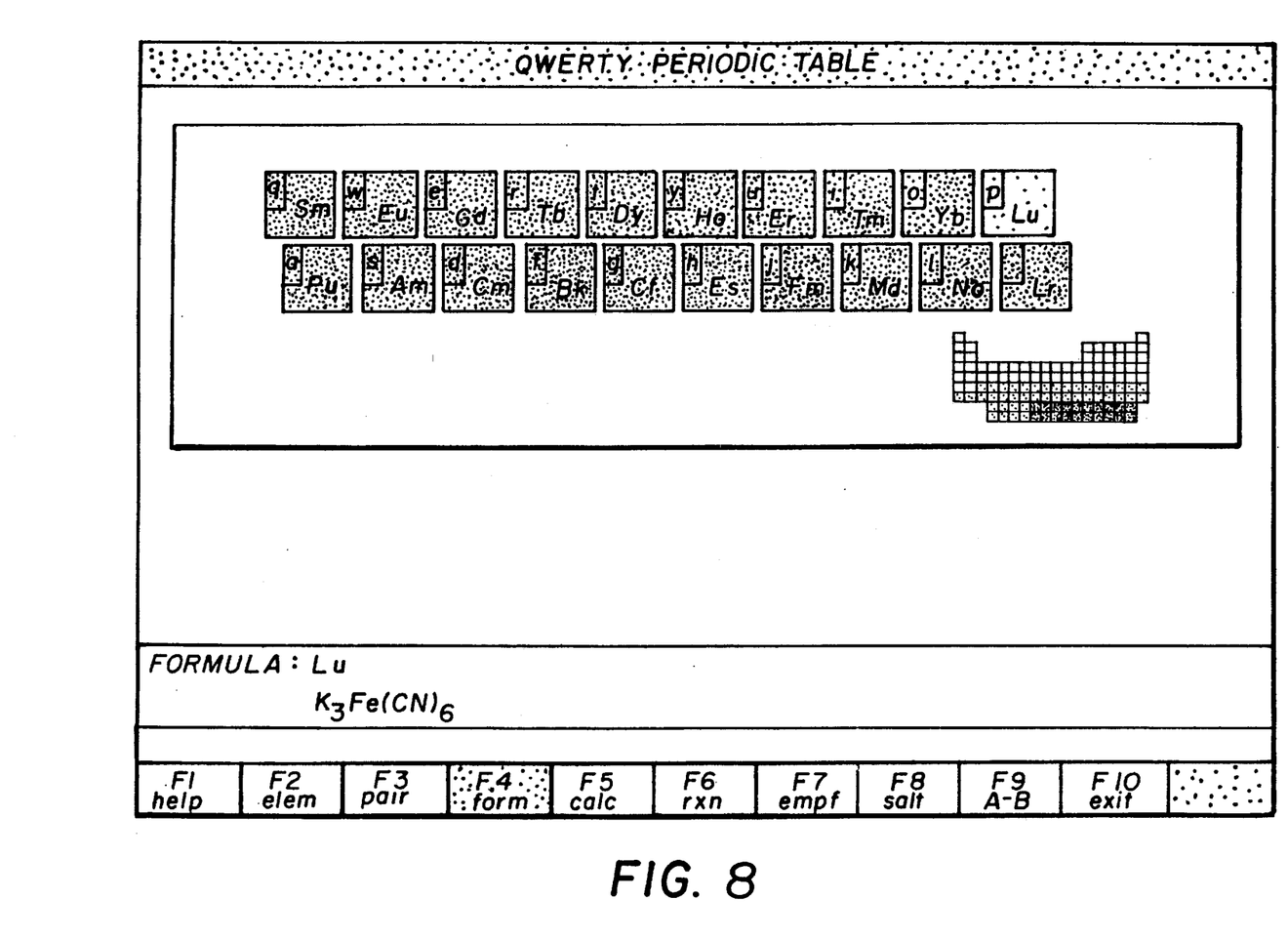
FIG. 8 is like FIG. 7 except that the partial array is composed of a different set of rare earth elements.

FIG. 8 is like FIG. 7, but in this case, one wants to evoke lutetium(Lu). This element is outside the FIG. 7 array and is reached by pressing the right arrow key until the double row of rare earth elements has been shifted far enough to bring a partial array containing Lu on screen..

Figure 9:
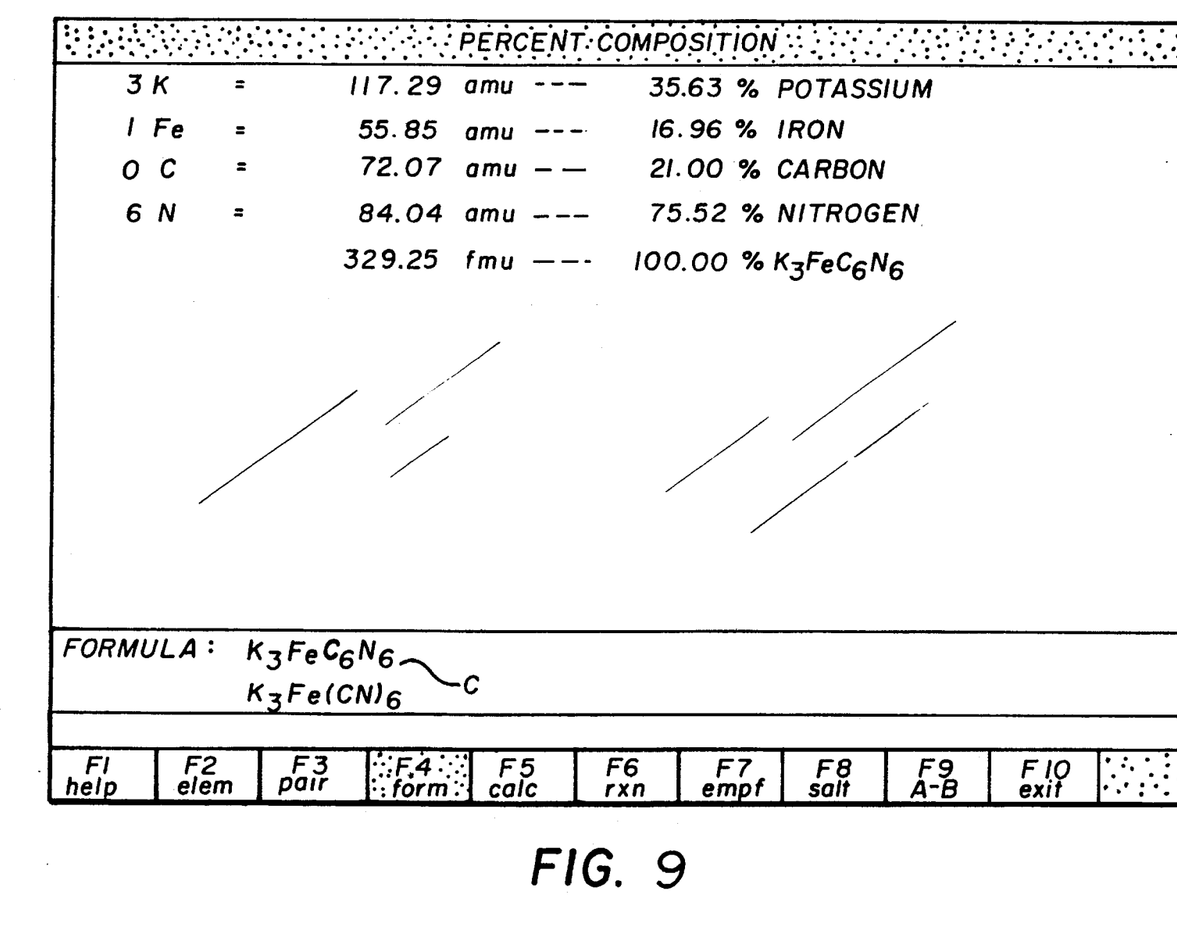
FIG. 9 shows a stage of operation of my invention wherein formula weight and percentage composition have been calculated and displayed on the CRT screen.

In FIG. 9, the conventional ENTER key of the key board has been pressed to get the formula weight and percentage composition. Here, the constituent formula appears in an upper position, in place of the Pu, and is followed by the cursor C. The original formula remains in the lower position shown FIG. 8.

FIG. 10 shows the keyboard layout of the invention of my above-identified patent, including the type of periodic table from which the partial arrays of the present invention are drawn. It will be seen that the keyboard has function keys F1 through F7 which cause operations of the corresponding functions set forth in my aforesaid patent. As will be seen from Figures of the present invention, the same functions and three others are provided in the present invention. The ten functions of the present invention are, in order from left to right, HELP, ELEMENT PROPERTIES, PAIR, FORMULA, CALCULATION, REACTION, EMPIRICAL FORMULA, SALT, BOND, and EXIT, as shown in the drawing hereof. The particulars of these are, for the most part, described in my aforesaid patent, to which reference may be had for further description thereof. As the functions are incidental, their particulars need not be set forth herein.

That is to say that the present invention involving partial arrays operates the same for each of the ten said functions.

Finally, the compaction of the display afforded by my partial array system will lend itself to use in a compact instrument such as the HP48SX 12, FIG. 3 of my aforementioned patent, or the Franklin "Desktop DIGITAL BOOK SYSTEM". That is, it would combine computer, display, e.g., LCD, CRT, etc., and a keyboard of QWERTY type, as in the Franklin, or other type, as in the HP48SX, in one compact, highly portable instrument. In the case of the HP48SX, it will be noted that with it the partial arrays will have fewer elements because the calculator 12 shown in my patent is only six keys wide and seven keys high.

Having described my invention, I claim:

1. In an instrument having a screen and a keyboard, said instrument being constructed and arranged for performing chemical calculations and for displaying results of said calculations on said screen, such performing and such displaying being under control of keys of said keyboard, the improvement wherein keys of said keyboard are actuable by a user of said instrument for causing said instrument to display on said screen a partial array of the periodic table of elements, said partial array consisting essentially of some symbols of the elements in said table, and wherein said screen at the same time displays an icon having the shape of said table, but wherein the part of said shape corresponding to said symbols is visibly different from the rest of of said shape.

2. The improvement of claim 1 wherein the said partial array shows both the symbols of the elements thereof, and the location on said keyboard of keys corresponding to said symbols.

3. The improvement of claim 2 wherein said keyboard has the QWERTY configuration.

4. The improvement of claim 2 wherein said keyboard has keys which, when actuated, cause said instrument to display chemical formulae on said screen.

5. The improvement of claim 1 wherein the arrays are composed essentially of parallel rows having the form of next-adjacent element rows of the periodic table.

6. The improvement of claim 1 wherein the arrays are composed essentially of parallel columns having the form of next-adjacent element columns of the periodic table.

7. The improvement of claim 1 wherein the arrays are composed essentially of parallel rows and columns having the form of next-adjacent element rows and columns of the periodic table.

8. In an instrument having a screen and a keyboard, said instrument being constructed and arranged for displaying chemical formulae on said screen, such displaying being under control of keys of said keyboard,
the improvement wherein keys of said keyboard are actuable by a user of said instrument for causing said instrument to display on said screen a partial array of the periodic table of elements, said partial array consisting essentially of some symbols of the elements in said table, and wherein said screen at the same time displays an icon having the shape of said table, but wherein the part of said shape corresponding to said symbols is visibly different from the rest of said shape.

9. The improvement of claim 8 wherein the said partial array shows both the symbols of the elements thereof, and the location on said keyboard of keys corresponding to said symbols.

10. The improvement of claim 9 wherein said keyboard has the QWERTY configuration.

11. The improvement of claim 9 wherein said keyboard has keys which, when actuated, cause said instrument to make chemical calculations, and, as well, to display the results of said calculations on said screen.

12. The improvement of claim 8 wherein the arrays are composed essentially of parallel rows having the form of next-adjacent element rows of the periodic table.

13. The improvement of claim 8 wherein the arrays are composed essentially of parallel columns having the form of next-adjacent element columns of the periodic table.

14. The improvement of claim 8 wherein the arrays are composed essentially of parallel rows and columns having the form of next-adjacent element rows and columns of the periodic table.

* * * * *